April 1, 1969 — A. RIELI — 3,435,798
LOW-SILHOUETTE VEHICLE
Filed May 19, 1967 — Sheet 1 of 4

ANTHONY RIELI
INVENTOR

BY John Paul Robinson Jr.
ATTORNEY

April 1, 1969          A. RIELI          3,435,798

LOW-SILHOUETTE VEHICLE

Filed May 19, 1967          Sheet 2 of 4

ANTHONY RIELI
INVENTOR

BY John Paul Robinson Jr.
ATTORNEY

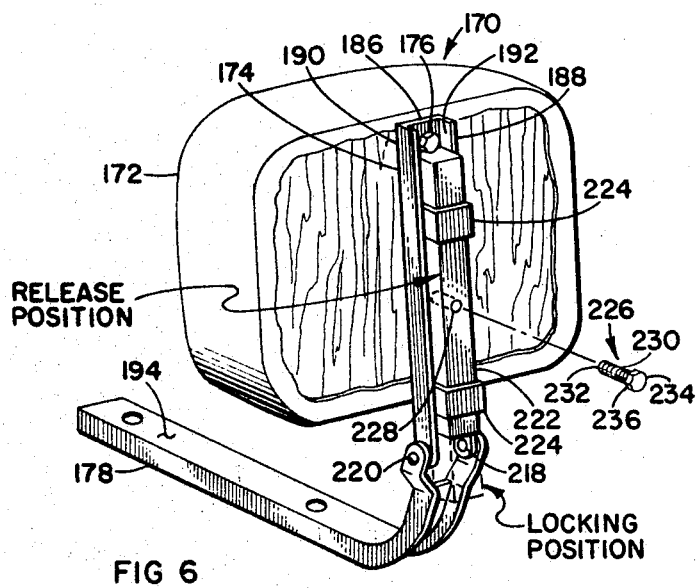
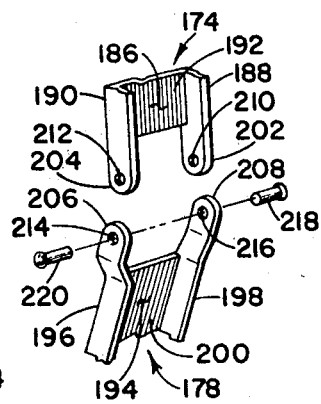
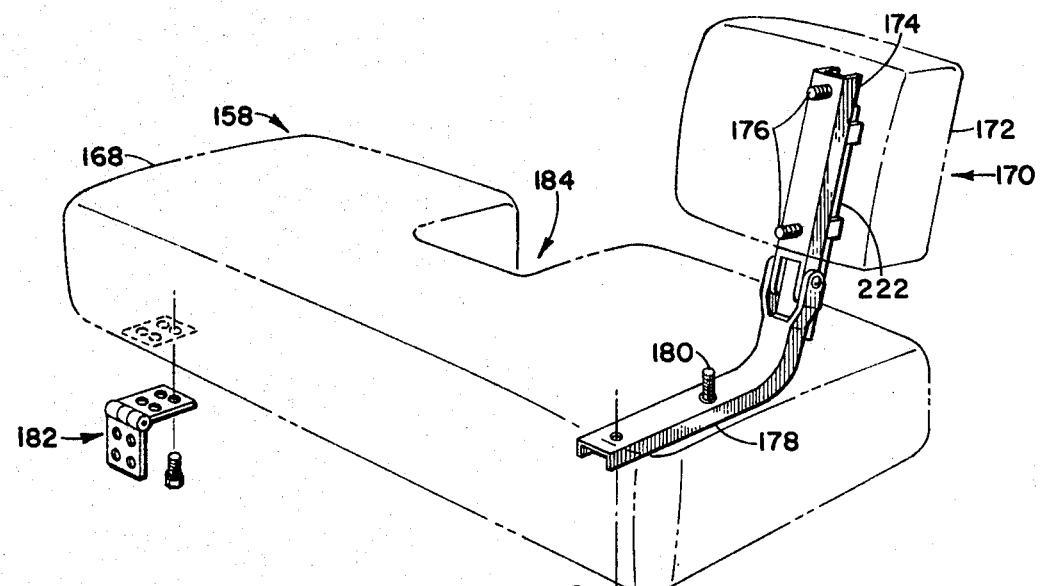
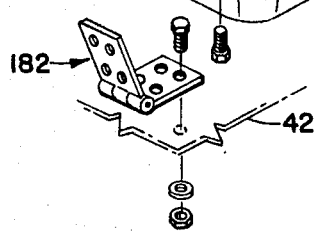

ANTHONY RIELI
INVENTOR

BY John Paul Robinson Jr.
ATTORNEY

United States Patent Office 3,435,798
Patented Apr. 1, 1969

3,435,798
LOW-SILHOUETTE VEHICLE
Anthony Rieli, Grosse Pointe, Mich., assignor to LTV Aerospace Corporation, Dallas, Tex., a corporation of Delaware
Filed May 19, 1967, Ser. No. 639,866
Int. Cl. B60f *3/00;* B60k *9/00*
U.S. Cl. 115—1                                       5 Claims

ABSTRACT OF THE DISCLOSURE

A vehicle having propulsion means, wherein a plurality of traction members are rotatably driven by a transmission mechanism drivingly connected to a variable-speed transmission which is operatively associated with a prime mover. The occupant-carrying zone is provided with a seating structure having a pair of pivotal backrest portions which can be changed at will, to enable the driver and/or drivers to actuate an adjacent steering and driving mechanism. A plurality of opposed water-reaction means is disposed on each side of the vehicle body to facilitate movement of the vehicle through a body of fluid. Also, a centrifugal exhauster is utilized as a means for providing a moving stream of high-velocity, low-pressure cooling air through the prime mover and transmission compartment.

---

This invention relates to a low-silhouette vehicle especially fitted to serve as a highly mobile carrier which is capable of maneuvering in substantially any environment.

In the past, low-silhouette vehicles have been designed for operating in restricted and confined areas such as mines, tunnels, or other environments wherein overhead clearances between the operating vehicle and other structural or naturally occurring elements necessarily were at an absolute minimum. With this limitation in mind, vehicles were designed in which the vehicle operator's station was positioned to one side of the vehicle and between the front and rear traction wheels. A pair of oppositely facing steering wheels and associated mechanism were generally located centrally of the operator's station, whereby the operator would assume a substantially supine position to operate the vehicle when traveling in one direction. When it was desired to operate the vehicle in the opposite direction, the operator was required to get up and move around to the other driving station opposite his previous driving station to enable him to operate the vehicle in the opposite direction. In these prior-art vehicles, the operator's station was a substantially horizontally extending platform with one vertically adjustable backrest support mounted adjacent each end thereof and in opposed relationship; thus, either one or the other of these backrest members provided support for the operator's back in either of the reclined positions which the vehicle operator desired to assume. When the operator was in one substantially supine position, his back was supported by an elevated backrest, and the opposed backrest in front of the operator could be collapsed to provide a substantially unobstructed view for the operator. These prior-art seating arrangements were extremely uncomfortable and fatiguing. Also, while the operator was required to get up and change driving stations when the opposite direction of travel was desired, under certain conditions and environments such changes of driving stations were impractical and/or virtually impossible. In addition, complicated dual steering mechanisms were employed, and these frequently malfunctioned.

With varying degrees of success, several attempts have been made to design an amphibious vehicle capable of traversing a body of water and/or traveling over land. Each of these early, amphibious vehicles generally had a plurality of outwardly extending paddle-wheel spokes fixedly connected to a wheel, whereby the vehicle could travel over a smooth, hard, consolidated land surface and/or traverse a body of water by utilizing these paddle-wheel spokes. This type of vehicle was satisfactory until an irregular and/or unconsolidated environment such as a swamp, a bog, tidal mud flats, rice paddies, or similar environments were encountered; for maneuverability of these prior-art vehicles through such irregular or unconsolidated terrain was extremely difficult and in most cases impossible. The outwardly extending paddle-wheel spokes of these prior-art vehicles would become interlocked and/or entangled with obstructions and result in stoppage or a reduction in vehicular velocity; or the paddle-spokes would be broken, which would reduce the effectiveness thereof. In addition, these broken pieces of paddle-spokes could become intermeshed with adjacent paddle-spokes and do irreparable damage thereto, or completely stop vehicle movement.

In previous vehicles, a pressure-cooling system was utilized wherein a fan was used to force cooling air under pressure through the engine chamber. In this system, the resistance to air-flow was imposed primarily on the exhaust or discharge outlet. This resulted in frequent, localized pressure-buildups within the engine chamber which resulted in ineffective cooling.

An object of the invention is to provide an amphibious vehicle having a plurality of water reaction means being arranged and constructed for converting a portion of the kinetic and potential energy of the water, carried or conveyed upwardly and in the direction of vehicular travel, by the rotating traction members, into an additional force to augment the linear velocity of the vehicle; thereby, providing a maximum linear velocity when the vehicle is traversing a fluid environment.

It is still another object to provide a new and unobvious centrifugal exhauster assembly for inducing a relative high velocity and low pressure current of cooling air through the prime mover and transmission components, for maintaining a desired operating temperature.

Further objects, advantages and unobvious features of the invention will be apparent from a study of the following specification and claims considered in conjunction with the accompanying drawing, which together describe, disclose and illustrate certain embodiments or modifications of the invention and what is considered to be the best manner of practicing the invention.

In the drawing:

FIGURE 5 shows schematically the relationship of the bottom seat structure to the backrest structure.

FIGURE 6 is an enlarged, perspective view of the backrest structure disclosing the details of the means for releasably locking the backrest member in a substantially vertical position.

FIGURE 7 is an exploded, perspective view of the pivotal connection between the bottom seat and backrest structures.

Figure 1:
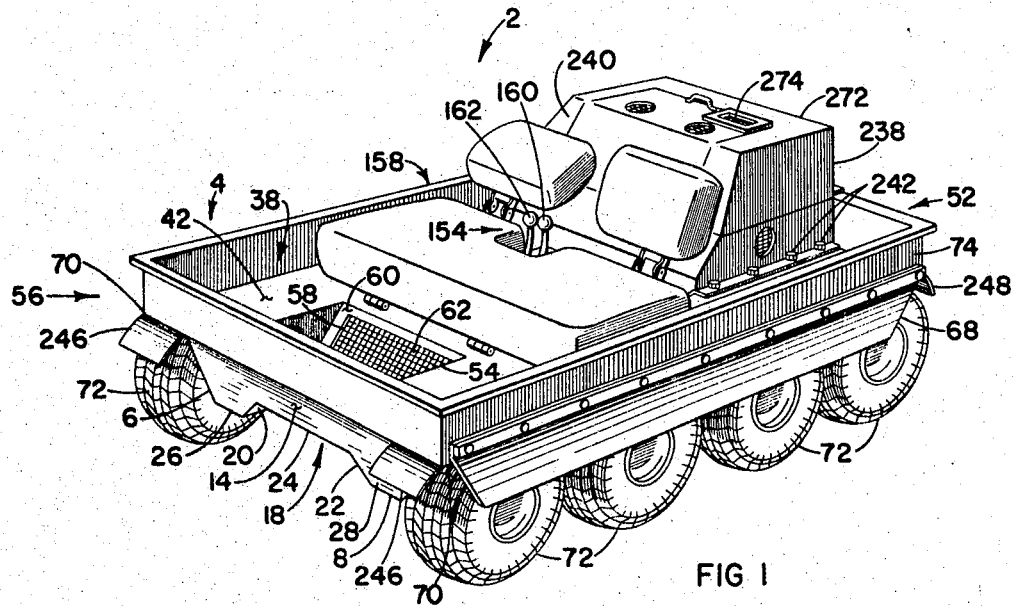
FIGURE 1 is a perspective view of the vehicle, disclosing the ararngement of the steering and speed control device located substantially interjacent a pair of adjustable backrest structures disposed in side-by-side relationship, together with other features.

Certain terminology will be used in the following description for convenience in reference only and is not intended to be limiting. The words "upwardly," "downwardly," "rightwardly" and "leftwardly" will designate directions in the drawing to which reference is made. The words "forwardly" and "rearwardly" will refer to the normal forward and reverse direction of travel of the vehicle, such directions being to the right and left, respectively, in FIGS. 2, 8 and 10. The words "inwardly" and "outwardly" will refer to directions toward and away from, respectively, a geometric axis of the vehicle. Said terminology will include the words specifically mentioned, derivatives thereof and words of similar import.

Referring now to the drawing, there is shown in FIGS. 1, 2, 8, and 10, a motor vehicle 2 having a lightweight, elongate vehicle body assembly 4. The material from which the vehicle body assembly 4 is fabricated generally has structural and physical characteristics and/or properties similar to those of a lightweight metal, such as aluminum, magnesium, and alloys thereof. Likewise, the vehicle body assembly 4 could be constructed or formed from a desired lightweight plastic material such as fiberglass, acrylonitrile-styrene/butadiene, or some other suitable material. The body assembly 4 includes an integral lower, outer shell or hull 6 extending generally the entire length and for a substantial portion of the width of the body assembly. The lower outer shell 6 is defined by a bottom wall 8 which constitutes a structure that interconnects a plurality of spaced side walls 10 and 12, and a plurality of spaced end walls 14 and 16.

The spaced end walls 14 and 16 are inclined to diverge outwardly, from the bottom wall 8, to structurally strengthen the lower shell 6 and to substantially reduce resistance to forward or rearward vehicular movement when the vehicle 2 is being operated in an unconsolidated environment such as a swamp, a bog, tidal mud flats, rice paddies, and other, similar environments.

The bottom wall 8 has a recess 18 (FIG. 9) which has a trapezoidal configuration in transverse cross section and is substantially centrally positioned interjacent the spaced side walls 10 and 12, and preferably extends substantially the entire length of the vehicle 2. The recess 18 is formed by a pair of spaced, inwardly converging side wall portions 20 and 22 of the bottom wall and a substantially horizontal top wall portion 24. Several advantages are derived from having a downwardly facing recess 18 which has a trapezoidal configuration, substantially coextensive with the lower shell 6. These advantages are: (a) the inwardly inclined side wall portions 20 and 22 significantly strengthen the bottom wall 8 of the vehicle body assembly 4 and (b) the vehicle 2 is enabled to maneuver over irregular terrain having upwardly extending obstructions or protuberances. It is readily apparent that, without recess 18, the vehicle 2 would have substantially limited maneuverability over such irregular terrain. The inwardly converging side wall portions 20 and 22 cooperate with side walls 10 and 12, and bottom wall 8 to define a pair of upwardly facing or opening spaced, side channels 26 and 28 (FIG. 1) disposed adjacent opposite sides of the vehicle and extending substantially the entire length of the body assembly 4.

The upper periphery or edge portion of the lower shell 6 has an outwardly projecting flange member 32 integral therewith and generally continuously extending about the upper edge portion. The purpose of flange member 32 is to add rigidity and function as a reinforcing ring disposed adjacent the upper extremity of lower shell 6. The flange member 32 (see FIGS. 2 and 10) contains a plurality of spaced apertures 32 extending therethrough and adapted to receive conventional fastener means (not shown) which detachably secure a substantially rigid floor assembly 38 to the lower shell 6. A fluid sealing means or element 40 is disposed between flange member 32 and the substantially horizontal floor plate 42 to prevent the ingress of liquids therebetween. The floor assembly 38 includes the floor plate 42, which is spaced from and substantially coextensive with the bottom wall 8 for defining a lower compartment 44 therebetween and for receiving a power transmission means 46, a portion of a prime mover 48, and associated and/or auxiliary components and parts operatively associated therewith. The floor plate 42 has an elongate opening 47 (FIG. 10) adjacent the rear or one end portion 52 of body assembly 4, for receiving a portion of prime mover 48 which extends upwardly from lower compartment 44. A footwell 54 is disposed in the front or the other end portion 56 of the floor plate 42 and has an elongate, cooling air inlet 58 opening in at least one wall portion 60. A screen, grill or some conventional, foraminous material 62 completely covers the opening 58 and is retained in position on wall portion 60 by conventional fasteners (not shown). The floor assembly 38 is substantially wider than lower, outer shell 6 and extends outwardly from and overhangs both side walls 10 and 12 of lower shell 6; the floor assembly 38 thus forms a first and a second overhanging side portion 64 and 66, respectively and generally extends approximately the entire length of the body assembly 4. Each overhanging side portion 64, 66 has a skirt member 68 fixedly attached thereto, adjacent its lateral, outermost edge 70 and depending therefrom an amount sufficient to enclose the upper portion of a plurality of oversized pneumatic tires, wheels, or other traction elements or members 72 which are carried by the lower, outer shell 6 and mounted for rotation relative thereto. An upstanding side wall 74 extends continuously about the outer periphery of floor plate 42 and has an outwardly extending flange member 76 which functions as a reinforcing ring to add structural strength and ridigity to side wall 74.

Attention is now directed to FIGS. 2-4 and 10 which show a common power plant or prime mover 48 which, for example, could be a conventional internal-combustion engine mounted on and carried by the lower outer shell 6. The prime mover 48 is drivingly connected to a transmission means 46 that comprises an infinitely variable-speed transmission means 78 operatively associated with a transmission mechanism 80 for varying the speed of the vehicle 2. A drive pulley 82 is fixedly secured to the prime mover output shaft 84 for simultaneous rotation therewith at substantially the same angular velocity. The drive pulley 82 frictionally engages a conventional drive belt 86 operatively connected to a plurality of driven pulleys 88 and 90 which are fixedly secured to input shafts 92 and 94 of a first and a second infinitely variable-displacement, reversing swashplate, piston pumps 96 and 98, respectively. The first and second pumps 96 and 98 are operatively connected through a first and second conventional hydraulic conduit means (not shown) to a first and a second fixed displacement hydraulic motor 100 and 102 respectively. The hydraulic motors have an outwardly extending drive shaft 104 and 106, and the drive shaft of each motor is disposed in substantially spaced, parallel relationship with driven axles 108 and operatively coupled through a first and a second power drive train 110 and 112 to a first and a second series, 114 and 116 respectively, of driven traction elements 72. The first series 114 of driven traction elements 72 is rotatably mounted on one side and the second series 116 of driven traction elements 72 is rotatably mounted on the other side of the lower outer shell member 6 of the vehicle body assembly 4. The power drive trains 110 and 112 each include a double speed reduction mechanism 118 and 120, respectively.

A plurality of divided or spaced driven axles 108 extend outwardly through a plurality of complementary openings (not shown) in side walls 10 and 12, and a conventional fluid seal (not shown) is provided for each axle, between the same and its respective side wall. Thus, the lower compartment 44, as defined above, is a substantially completely enclosed area, hence substantially free of water and dirt.

In the preferred embodiment, each pair of opposed, axially spaced apart or divided axles 108 is transversely positioned with respect to vehicle 2 and is disposed in a generally aligned relationship, with four such pairs of transversely disposed axles 108 equally spaced longitudinally of the vehicle. The alignment and equal spacing of the axles 108, however, is by no means necessary, and it is within the scope of the present invention to incorporate a number of different axle constructions and/or arrangements therein.

The inner-end portion of each axle 108 is received and journaled in a bearing structure 122 which is anchored or attached to one of the converging side wall portions 20 or 22. At least one, oversized pneumatic tire 72, for example, a 9.50 x 18 tire utilizing a pressure of 10 p.s.i. and a tread of 38.8 inches, is detachably connected adjacent the outer-end portion of each driven axle 108 for simultaneous rotation therewith, at the same angular velocity. These oversized tires furnish additional buoyancy to the vehicle 2 when traversing a body of water. In the preferred embodiment, the first series 114 of driven traction elements 72 is disposed beneath the overhanging side portion 66 and intermediate the side wall 12 and depending skirt member 68. Likewise, the second series 116 of driven traction elements 72 is similarly positioned beneath overhanging side portion 64 and between side-wall 10 and depending skirt member 68.

The driven axles 108 receive drive-torque through a pair of conventional chain and sprocket assembly or arrangement 124 and 126 for independently driving the first series 114 and the second series 116 of driven traction elements 72 at a desired, predetermined angular velocity. In the chain and sprocket drive arrangement illustrated in FIGS. 2, 3 and 10, the rearmost or fourth pair of divided axles 108 receives the drive-torque through speed-reduction mechanisms 118 and 120. The interengaging chain and sprocket drive assembly 124 and 126 substantially simultaneously and uniformly drives the fourth (rearmost), third, second, and first (foremost) pairs of divided axles 108, whereby all four pairs of spaced drive axles are driven at substantially the same angular velocity when the vehicle 2 is traveling forwardly in a straight-ahead manner (or in reverse) at a generally constant linear velocity. Each driven axle 108 has a sprocket 128 fixedly secured thereto adjacent the inner-end portion thereof. Each pair of opposed sprockets 128 is fixedly mounted on adjacent axles 108 and the sprockets of each pair are drivingly interconnected by a complementary chain 130. The conventional chain and sprocket drive arrangement is well known in the art and need not be described in detail. The members of the pair of double-speed reduction mechanisms 118 and 120 (FIGS. 2–4 and 10) have identical component parts which are referred to by the same reference numerals. The double-speed reduction means or mechanisms 118 and 120 receive power from hydraulic motors 100 and 102 respectively. Each speed-reduction mechanism includes an integral sprocket assembly 132 (FIGS. 3 and 4) comprising a first sprocket 134 having a pitch diameter of approximately 6 inches and a second sprocket 136 whose pitch diameter is about 3 inches. A hub portion 138 rigidly interconnects spaced, substantially parallel sprockets 134 and 136 and has a bore extending therethrough for receiving a bushing 142 whose own bore is adapted to receive an axle 108 for rotatably mounting sprocket assembly 132 on each third axle. The sprocket assembly 132 may be formed as a unitary structure; however, the assembly 132 may be formed with one or both of the sprockets 134 and 136 being a separate structure welded or secured thereto by well known means and having a bore in aligned relationship with the bore of hub portion 138. A pair of retaining rings 140 are disposed on opposite sides of each sprocket assembly 132 with each retaining ring adapted to be received in a complementary groove 144 for restraining axial movement of assembly 132 along its respective axle 108. Thus, the speed-reduction mechanisms 108 and 110 are structurally carried by each third axle and are adapted for independent relative rotation with respect thereto. Each first sprocket 134 is driven by an endless chain 146 which is disposed about a third sprocket 148 having a pitch diameter of approximately 2 inches and with each of the hydraulic motor drive shafts 104 and 106 having at least one sprocket, such as shown at 148, fixedly attached thereto for rotation therewith. A fourth sprocket 150 is fixedly secured to the rearmost or fourth axle and has a pitch diameter of approximately 6 inches. The sprocket 150 operatively engages and is driven by an endless chain 152 which is disposed about sprocket 136.

Thus, between sprockets 148 and 134 there is substantially a 3:1 speed reduction and between sprockets 136 and 150 there is substantially a 2:1 speed reduction; therefore, there is substantially an overall 6:1 speed reduction between sprockets 148 and 150. Accordingly, each of the aforementioned double speed reduction mechanisms is designed to provide a simplified and compact speed reduction device which may be disposed in a comparatively small area and with the component parts thereof being of extremely rugged proportions to permit the device to sustain the repeatedly violent shocks to which it is subjected.

Figure 2:
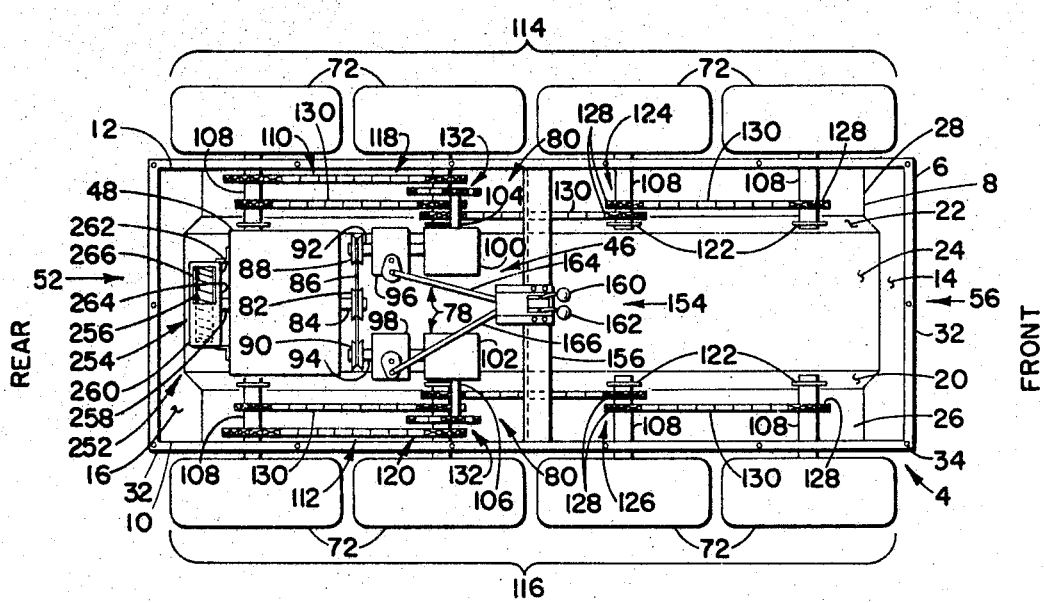
FIGURE 2 is a plan view, with the floor plate removed, of the vehicle showig the details of the propulsion means wherein a plurality of traction members are rotatably driven by a transmission mechanism which is drivingly connected to an infinitely variable-speed transmission operatively associated with a prime mover.
Figure 4:
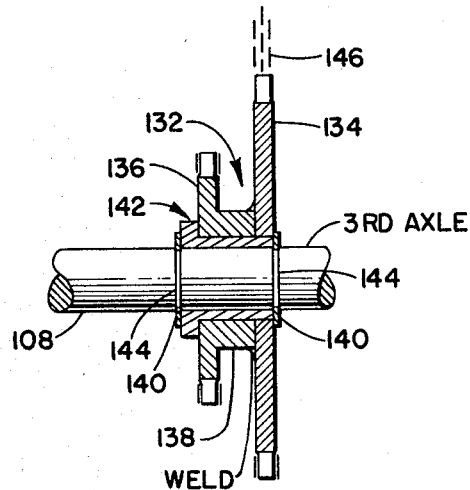
FIGURE 4 is a cross sectional view in elevation of the unitary sprocket assembly utilized in the double speed-reduction mechanism of the present vehicle taken along line A—A of FIG. 3.
Figure 3:
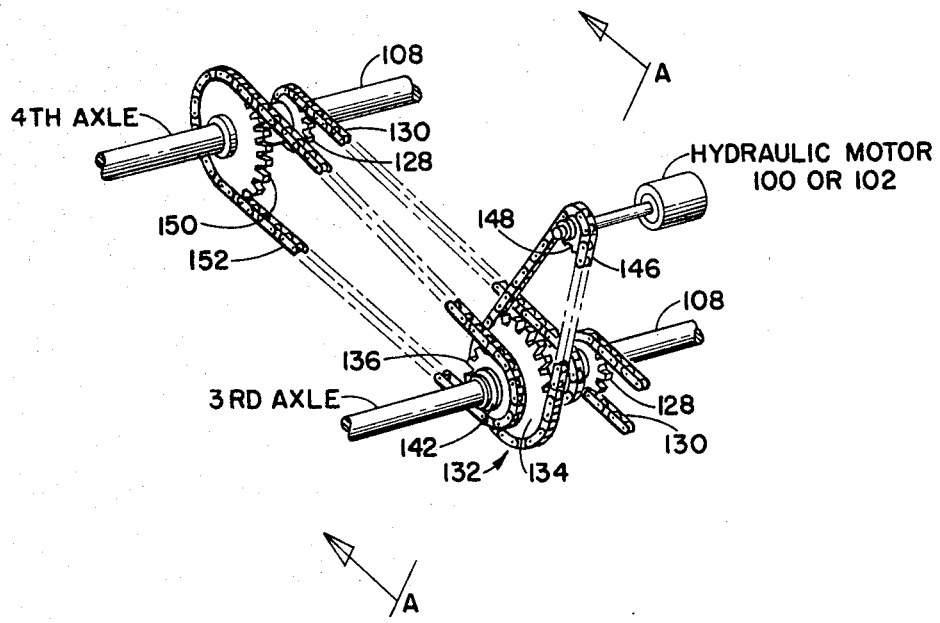
FIGURE 3 is a perspective view of the double speed-reduction mechanism employed in conjunction with the vehicle power drive trains.
Figure 10:
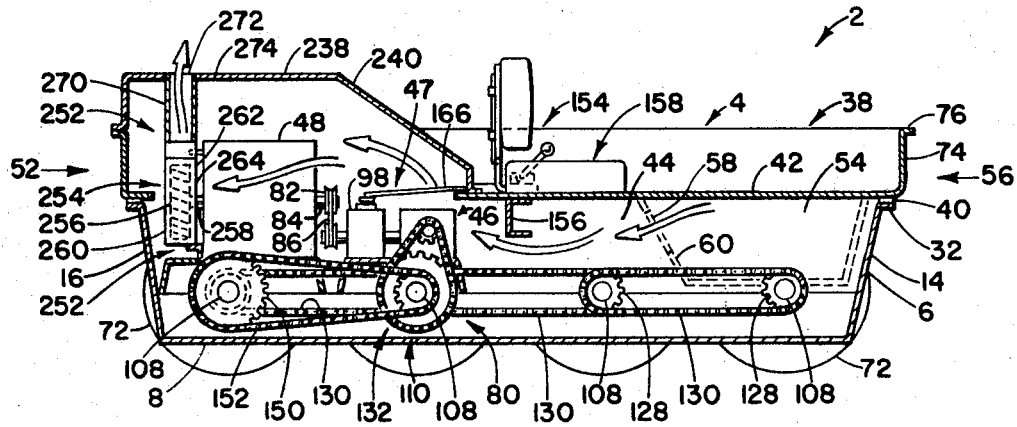
FIGURE 10 is a longitudinal sectional view in elevation of the vehicle.

A control assembly 154, as shown in FIGS. 2 and 10, is attached to a structural member 156 extending between and having opposite ends connected to side walls 10 and 12. Member 156 is disposed substantially equidistant between end walls 14 and 16 for supporting floor plate 42 and a seat structure 158. The control assembly 154 includes a pair of closely spaced, pivotally mounted control levers 160 and 162 which may be directly or indirectly connected in any desired manner, such as by linkage 164 and 166, to the swash plate on infinitely variable displacement pumps 96 and 98 for controlling the amount of oil flow to the hydraulic motors 100 and 102 for determining the speed and direction of rotation of the respective output shafts 104 and 106.

During normal operation of the vehicle, the operator will make a simultaneous, coordinated movement of the levers 160 an d162 (FIGS. 1, 2 and 10) to effect a forward or reverse linear travel of the vehicle 2. With the levers in a substantially vertical position, the infinitely variable-speed transmission means 78 is in neutral and there is no "free-wheeling" from the transmission means 78 when the vehicle speed or direction of travel is changed, as dynamic braking of the vehicle is controlled by the infinitely variable-speed transmission means 78.

Steering of the vehicle 2 is accomplished by a differential in the speed of the traction elements or tires 72. When the tires on one side of the vehicle 2 are traveling at a greater angular velocity than the tires on the other side, the vehicle 2 will tend to turn toward the slower-rotating side. Pivot-steering is accomplished by reversing the direction of rotation of the tires on one side of the vehicle 2 and rotating the tires on the other side in the opposite direction.

The seat structure 158, as illustrated in FIGS. 5, 6 and 7, comprises a bottom seat structure or arrangement 168 and at least one pivotally adjustable backrest structure 170 disposed adjacent thereto. In the preferred embodiment, a pair of backrest structures 170, as illustrated in FIG. 1, are positioned in a substantially side-by-side relationship. FIGS. 5, 6, and 7 illustrate in detail the backrest structure 170. This backrest structure generally includes a backrest member 172 attached to a first structural support or channel member 174 by a plurality of conventional fasteners 176, and is pivotally movable therewith about a generally horizontal axis. A second structural support or channel member 178 is secured to the bottom seat structure 168 by conventional fastener means 180. The bottom seat structure 168 is pivotally attached to floor plate 42 by a plurality of spaced hinge means 182, and in the embodiment shown in FIG. 5 the bottom seat structure has a recess 184 disposed between the spaced backrest structures 170 for receiving the control assembly 154. The bottom seat structure 168 illustrated is a unitary structure; however, this bottom seat structure may include two spaced seat structures.

Both the first and second structural support members 174 and 178, as shown in FIGS. 5, 6 and 7, are formed from conventional structural channel members. The first channel member 174 has a web portion 186 interconnecting spaced, substantially parallel, outwardly extending leg or flange portions 188 and 190 that define a passageway 192. Likewise, second channel member 178 has a web portion 194 similarly interconnecting outwardly extending leg or flange portions 196 and 198 defining a passageway 200. Each leg or flange portion 188, 190, 196 and 198 has a lug member 202, 204, 206 and 208, respectively, attached thereto and extending therefrom, with each lug member 202, 204, 206 and 208 having openings 210, 212, 214 and 216, respectively, extending therethrough and in aligned relationship for receiving a pair of pins 218 and 220. The pin 218 is inserted in and extends through aligned openings 210 and 216; similarly, pin 220 is inserted in and extends through aligned openings 212 and 214. Both pins 218 and 220 may be lightly clinched to deform the end portions thereof radially outward an amount sufficient to retain the lug portions 202 and 208, 204 and 206 in a juxtaposed relationship; thus establishing a substantially horizontal pivot axis or a means pivotally interconnecting the first and second structural support members for permitting pivotal movement of backrest structure 170 with respect to bottom seat structure 168.

A locking means, member, bar or pin 222 is snugly, yet slidably, received in passageway 192 and a plurality of spaced guide means 224 are carried by and/or connected to the first structural member 174 for maintaining the locking member 222 in a continuously aligned relationship with passageway 192. However, the relationship may be reversed and the guide means 224 may be carried by second structural member 178, with the locking member 222 being received in and aligned with passageway 200. The locking means 222 is movable between a "release" position (as shown in solid lines in FIG. 6) for permitting pivotal movement between the first and second structural support members, 174 and 178, and a locking position (shown in broken lines) for releasably locking the first and second structural support members 174 and 178 against pivotal movement. Preferably the lower portion of locking member 222 is so constructed and arranged as to be slidably received in passageway 200 of the second structural support 178.

Each locking member 222 has, operatively associated therewith, a means 226 for retaining the locking member 222 in the position to which it is moved. In the embodiment disclosed in FIG. 6, the retaining means 226 is carried by locking member 222. The retaining member 226 includes an internally threaded bore 228 extending transversely through member 222 and having a longitudinal axis disposed substantially normal to web portion 186. An externally threaded bolt or member 230 is received in and threadedly engages the complementary threads in bore 228. The threaded shank of member 230 has a greater axial length than the bore 228 so that, when the member 230 is tightened, one end-portion 232 will bear against web portion 186 and simultaneously force locking member 222 outwardly into a frictionally engaging or retaining relationship with guide means 224, whereby locking member 222 is substantially frictionally retained or restrained in the position to which it is moved.

Moreover, the other end-portion 234 of externally threaded member 230 cooperates with guide means 224 to limit the sliding movement of locking member 222 relative to the first structural support 174. A tool engaging surface 236 of member 230 allows the vehicle operator to employ a conventional tool to tighten or loosen the member 230 for effecting movement of locking member 222 between a "release" and a "locking" position, thereby permitting the associated backrest structure 170 to pivot backward and/or away from the bottom seat structure 168.

A cover assembly or prime mover housing 238, as illustrated in FIGS. 1 and 10, has an outwardly inclined wall portion 240 which limits the backward pivotal movement of both backrest structures 170. The cover assembly 238 surrounds that portion of the prime mover 48 extending upwardly through elongate opening 47 and is attached to floor plate 42 by conventional fasteners 242.

During operation of the vehicle, the operator may elect to drive the vehicle 2 forwardly or rearwardly without having to move from one driving station to another driving station. An advantageous characteristic of the present invention is that a pair of individual, spaced backrest structures 170 are mounted in such a manner as to be pivotal about a substantially horizontal axis, whereby their position can readily be changed at will. The closely spaced control levers 160 and 162 disposed between the pair of backrest structures 170 allows either or both operators individually or collectively to drive and steer the low silhouette vehicle 2. Thus, the ease with which backrest structures 170 can be pivoted backward away from botton seat structure 168 permits one and/or both occupants of the vehicle readily to change their direction of facing for operating the vehicle 2 in the desired direction of travel. This ease of movement by both operators is normal and relaxed and far less physically fatiguing than other prior-art seating arrangements. Moreover, the operator is merely required to turn or rotate his body 180°, when moving from a substantially vertical to a substantially reclined position, in order to face in opposite directions for driving and steering the vehicle.

The vehicle 2, as illustrated in FIGS. 1 and 2, discloses the prime mover 48 located adjacent the rear and the occupant or load carrying area located adjacent the front and with the power transmission means 46 consisting of a pair of infinitely variable-speed transmissions 78 and a pair of transmission mechanisms 80 being in a balanced, parallel relationship on opposite sides of vehicle 2. Thus, the weight of the vehicle is evenly distributed to substantially eliminate upsetting the vehicle when traveling through water or other types of fluid environments.

Another benefit or advantage is derived by eliminating the vehicle chassis or frame which normally carries the vehicle load. Thus, by eliminating the weight of the chassis, without reducing the pay load carrying capacity, a new and unobvious lightweight, low-silhouette, vehicle 2 has been produced which exhibits capabilities of high maneuverability over marginal terrain. In the present invention, substantially all of the loads are borne by the walls of lower outer shell or hull 6.

Figure 8:
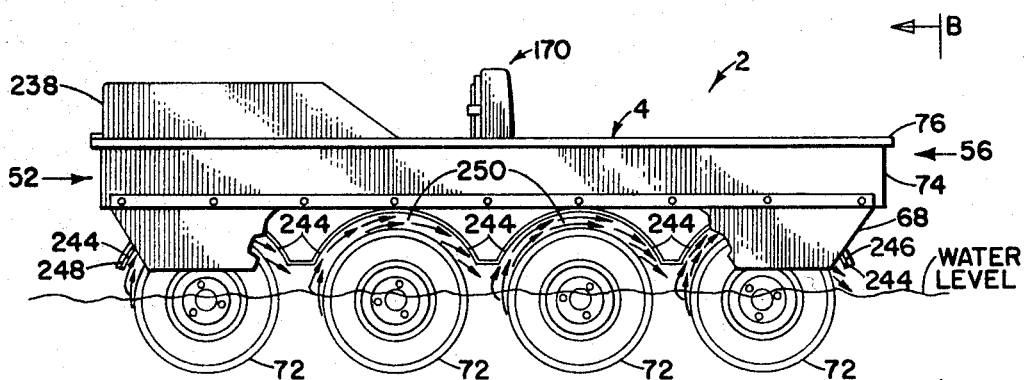
FIGURE 8 is a side elevational view of the vehicle shown in FIG. 1 with the skirt member partially broken away to illustrate the configuration of the opposed, curved water reaction means mounted adjacent each traction wheel.
Figure 9:
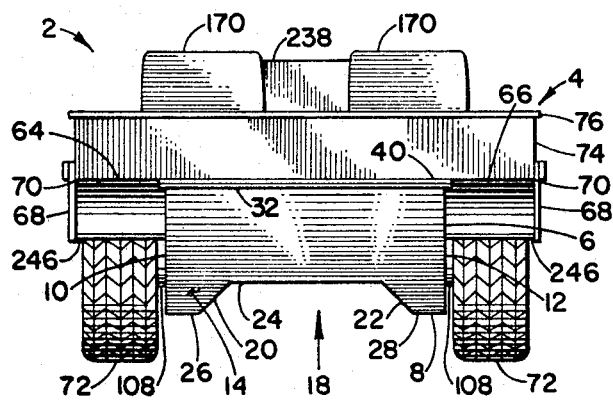
FIGURE 9 is a front elevational view of the vehicle taken along line B—B of FIG. 8.

In accordance with one embodiment of the present invention, as illustrated in FIGS. 8 and 9, a plurality of water reaction means, elements, members, inclined surfaces or vanes 244 are carried by and/or fixedly attached to each side of the vehicle body assembly 4 and depend therefrom. The water reaction means extends completely between each side wall 10 or 12 of lower shell 6 and the cooperating skirt member 68. A front water reaction means 246 depends from vehicle body assembly 4 and is generally positioned above and in front of the forwardmost traction member 72. Likewise, a rear water reaction means 248 depend from the vehicle body assembly 4 and is disposed above and behind the rearmost traction member 72. Each pair of adjacent traction members 72 have a pair of water reaction means 244 disposed therebetween, in a back to back relationship. Each traction member 72 has at least two spaced, water reaction means or inclined surfaces 244 disposed in opposed relationship, with one of said water reaction surfaces being inclined substantially opposite the other water reaction surface and with the opposed water reaction surfaces being positioned closely adjacent the outer peripheral portion or surface of each traction member 72 for augmenting the linear velocity of the vehicle when traveling in a forwardly or rearwardly direction. When each wheel 72 is rotating in one angular direction, one of said opposed, inclined surfaces functions as a water reaction surface for augmenting the linear velocity of the vehicle 2, while the other of said opposed inclined surfaces functions as a means to direct fluid toward said one surface; likewise, the opposed water reaction surfaces 244 function in the same manner, but in reverse relationship when the traction member 72 is rotating in the opposite angular direction. The skirt 68 depends from each overhanging side portion 64 or 66 for completely covering or enclosing the spaced water reaction means 244 and a substantial portion of traction members 72 to prohibit the lateral or sidewise discharge of water from the area 250 between the outer peripheral surface of the traction members 72 and the opposed water reaction surfaces, whereby substantially all or at least a major portion of the water within area 250 is caused to impinge against a water reaction surface 244 to produce a force that augments the linear velocity of the vehicle. The water reaction surface is formed from sheet metal or some other desired material and, in the preferred embodiment, has a curved configuration which (as shown in FIG. 8) is uniformly spaced from and surrounds substantially all of the upper portion of an associated traction member.

To demonstrate the operation of this embodiment of the invention, reference is now made to FIG. 8, which indicates, by arrows, the flow of water or other fluid around the outer periphery of the rotating traction members 72 when the vehicle is traveling in a forwardly direction. Conversely, of course, fluid flow will be in the opposite direction when the vehicle is traveling in a rearwardly or reverse direction. When a traction member rotates in contact with a body of water, there is a certain amount of water which initially adheres to the peripheral portion of the traction member as it rotates upward into air. Surface tension of this water is usually not high enough to hold it on the traction member indefinitely, and it is subsequently thrown off, with the result that it becomes a potential source of energy if properly utilized. The water that is conveyed forwardly by the rotating traction members 72 impinges against water reaction surfaces 244, and a substantial portion of the kinetic and potential energy contained therein is converted into a force tending to move the vehicle in the direction of travel. Thus, the vehicle 2 can be steered and maneuvered in an unconsolidated fluid environment, such as water, with the same or equivalent ease with which it is maneuvered on land.

A vehicle ventilation means or arrangement 252 for cooling the prime mover 48 and power transmission means 46 is illustrated in FIGS. 2 and 10 of the drawing, to which reference is now made. The lower outer shell 6 cooperates with the floor assembly 38 and cover assembly 238 for defining a cooling air flow passageway, as indicated by arrows, through the entire lower compartment 44. A centrifugal exhauster mechanism or assembly 254 comprising a centrifugal impeller 256 having a substantially axial air inlet is fixedly secured adjacent one end of the prime mover's crankshaft 258 for simultaneous operation therewith; however, the impeller 256 may be indirectly connected to the crankshaft 258 by utilizing suitable apparatus. The exhauster assembly 254 includes a scroll-shaped housing 260 which surrounds the impeller 256 and has one wall portion 262 having a substantially centrally or axially disposed air inlet opening 264 communicating with the interior of lower compartment 44 and an air outlet opening 266 disposed in a plane substantially parallel to the axis of rotation of the impeller 256. A hollow duct 270 has one end connected to air outlet 264 for communicating with the interior of scroll housing 260 and an opposite end connected to a cooling air outlet 272 disposed in a wall portion 274 of cover assembly 238 for exhausting cooling air from lower compartment 44. Thus, the centrifugal exhauster mechanism 254 induces a high-velocity and low-pressure current of cooling air through compartment 44 to maintain the prime mover 48 and transmission means 46 at a desired operating temperature. The suction cooling system of the present invention pulls a large volume of cooling air through the lower compartment 44 to a desired or predetermined ducting point and then drives the heated air outside, thereby eliminating the need for auxiliary ventilating fans. Moreover, by employing a centrifugal exhauster the resistance to cooling air flow is imposed upon the cooling air inlet 56, and there is substantially no pressure-buildup in lower compartment 44 which would reduce the heat exchange capacity of the cooling air being circulated therethrough.

From the above description, it is readily apparent the present novel inventive concept for an amphibious, low-silhouette vehicle presents a lightweight individualized vehicle especially fitted to serve as a highly mobile logistics carrier. Such vehicles must have high maneuverability over marginal terrain to permit rapid conveyance of large amounts of material and/or equipment, over presently impassable topography, to a predetermined point of operation.

While only one embodiment of the invention, together with modifications thereof, have been described in detail herein and shown in the accompanying drawing, it will be evident that various further modifications are possible in the arrangement and construction of its components without departing from the scope of the invention.

What is claimed is:

1. A highly mobile, low-silhouette vehicle comprising:
  an elongate vehicle body assembly having a plurality of driven axle shafts extending outwardly from opposite sides of the body assembly and mounted for relative rotation with respect thereto and a plurality of traction members operatively associated with the axle shafts adjacent the outer end portions thereof;
  transmission means operatively associated with the axle shafts for driving said axle shafts at a desired angular velocity;
  a prime mover having a power output shaft drivingly connected to the transmission means;
  a seat assembly carried by the body assembly;
  a control assembly operatively connected to the transmission means for selectively varying the speed thereof, said control assembly being carried by the vehicle body assembly and disposed adjacent the seat assembly for permitting at least one passenger to actuate the control assembly to regulate the motion of the vehicle;
  the elongate vehicle body assembly including:
  a lower, outer shell member extending substantially the entire length and for a substantial portion of the width of the vehicle body assembly and having a bottom wall, spaced sidewall portions, and a plurality of spaced endwall portions, the bottom wall being structurally associated with the spaced sidewall portions and the spaced endwall portions;
  a floor assembly carried by the lower outer shell member and spaced from and substantially coextensive with the bottom wall for defining a lower compartment therebetween and having the transmission means disposed therein, said transmission means being drivingly connected to said first and second series of driven axle shafts, said floor assembly extending outwardly from the sides of the lower shell member to form overhanging side portions for covering the traction members and extending approximately the entire length of the vehicle body assembly; and water reaction, means for augmenting the linear velocity of the vehicle when traveling in a forwardly direction, and likewise for augmenting the linear velocity of the vehicle when traveling in a rearwardly direction, said water reaction means comprising an arcuate surface associated with each traction member and rigidly fixed to the body, said surface being substantially uniformly spaced from and surrounding substantially all of the upper portion of each traction member, whereby the water which adheres to the peripheral portion of a rotating traction member as said member rotates away from a body of water into air until it is subsequently thrown off said peripheral portion impinges on the arcuate surface in a direction such that the kinectic energy in said thrown water augments the movement of the vehicle.

2. The elongate vehicle body assembly recited in claim 1, further including a skirt member extending substantially the entire length of the vehicle body assembly and depending from each of the overhanging side portions for enclosing said water reaction means and a substantial portion of the traction members for preventing the lateral discharge of water from the space between the respective arcuate surface and the outer peripheral portion of each traction member.

3. The low-silhouette vehicle recited in claim 1, said transmission mechanism comprising a first power drive train drivingly connected to the first series of driven traction elements and a second power drive train drivingly connected to the second series of driven traction elements for independently driving the first and second series of traction elements.

4. The low-silhouette type vehicle as recited in claim 3, the variable-speed, transmission means comprising a first and a second variable-displacement hydraulic pump drivingly connected to the prime mover and operatively associated with a first and a second hydraulic motor respectively, a first and a second hydraulic conduit means operatively interconnecting the first and second hydraulic pumps to the first and second hydraulic motors respectively for transmitting fluid discharged from the respective pumps to the motors; and the first and second hydraulic motors being drivingly connected to the first and second power drive trains respectively for driving the first and second series of traction elements.

5. A highly mobile, low-silhouette vehicle comprising:
a lower, outer shell member extending substantially the entire length and for a substantial portion of the width of the vehicle, and having a bottom wall, spaced sidewall portions, and a plurality of spaced endwall portions, the bottom wall being structurally associated with the spaced sidewall portions and the spaced endwall portions;

a first series of driven traction wheels rotatably mounted on one side of the shell member and a second series of traction wheels rotatably mounted on the other side thereof;

a floor assembly, carried by the lower outer shell member, being spaced from and substantially coextensive with the bottom wall for defining a lower compartment having a transmission means disposed therein, with the transmission means being drivingly connected to said series of traction wheels;

a prime mover mounted on the lower outer shell member and with said prime mover being operatively connected to the transmission means for transmitting power thereto;

a seat assembly carried by the body assembly;

a control assembly operatively connected to the transmission means, said control assembly being disposed adjacent the seat assembly for permititng at least one passenger to actuate the control assembly to regulate the motion of the vehicle;

means including the lower outer shell and floor assembly for defining a cooling air flow passageway through the lower outer shell member for cooling the transmission means and the prime mover;

a centrifugal exhauster mechanism operatively associated with the air flow passageway for inducing the flow of air therethrough at a substantially high velocity and low pressure, said centrifugal exhauster mechanism being drivingly connected to the prime mover for simultaneous operation therewith;

said floor assembly extending outwardly from the sides of the lower shell member to form overhanging side portions which extend approximately the entire length of the vehicle with each series of said traction wheels substantially underlying a respective one of the overhanging side portions;

water reaction means for augmenting the linear velocity of the vehicle when traveling in a forwardly direction, and likewise, for augmenting the linear velocity of the vehicle when traveling in a rearwardly direction, said water reaction means being carried by the vehicle body assembly and comprising at least two spaced, inclined surfaces in opposed relationship with one surface inclined substantially opposite the other surface and with said surfaces being disposed adjacent the outer peripheral portion of each wheel.

References Cited

UNITED STATES PATENTS

| | | | |
|---|---|---|---|
| 2,067,758 | 1/1937 | Flogaus | 180—54 |
| 2,397,791 | 4/1946 | Kramer et al. | 115—1 |
| 3,188,996 | 6/1965 | Thompson | 115—1 |
| 3,266,591 | 8/1966 | Sampietro et al. | 115—1 |

ANDREW H. FARRELL, *Primary Examiner.*

U.S. Cl. X.R.

180—54

PO-1050
(5/69)

UNITED STATES PATENT OFFICE
CERTIFICATE OF CORRECTION

Patent No. 3,435,798　　　　　　　　Dated　April 1, 1969

Inventor(s)　ANTHONY RIELI

It is certified that error appears in the above-identified patent and that said Letters Patent are hereby corrected as shown below:

Column 2, line 50, "ararngement" should read -- arrangement --; line 55, "showig" should read -- showing --; line 63, "cross sectional" should read -- cross-sectional --. Column 4, line 6, for "32" read -- 34 --; line 48, for "intermal" read -- internal --. Column 5, line 46, after "3" add a comma. Column 6, line 55, for "an d" (first occurrence) read -- and --. Column 7, line 67, for "member" (second occurrence) read -- means --. Column 8, line 35, for "botton" read -- bottom --. Column 11, line 8, after "reaction" cancel the comma. Column 12, line 20, for "permititng" read -- permitting --.

SIGNED AND
SEALED
JUN 16 1970

(SEAL)
Attest:

Edward M. Fletcher, Jr.
Attesting Officer

WILLIAM E. SCHUYLER,
Commissioner of Pate

M-23